Sept. 7, 1965   A. L. JORDE   3,204,339
MEASURING MEANS FOR LARGE SURFACE AREAS
Filed April 13, 1962
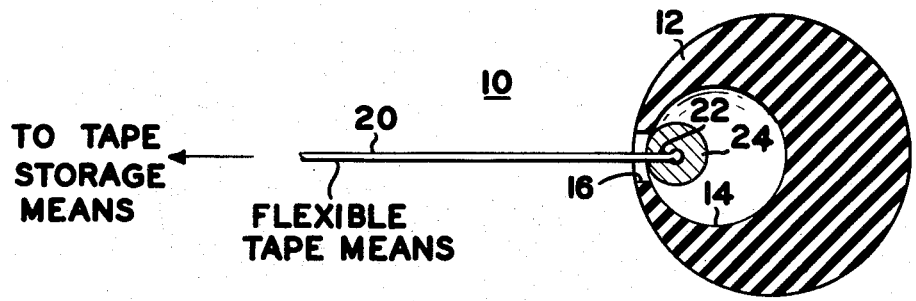
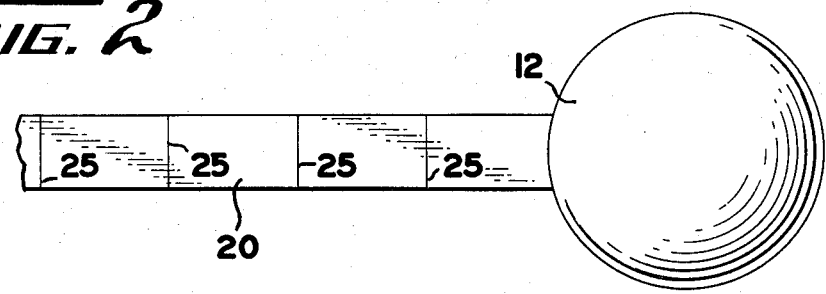
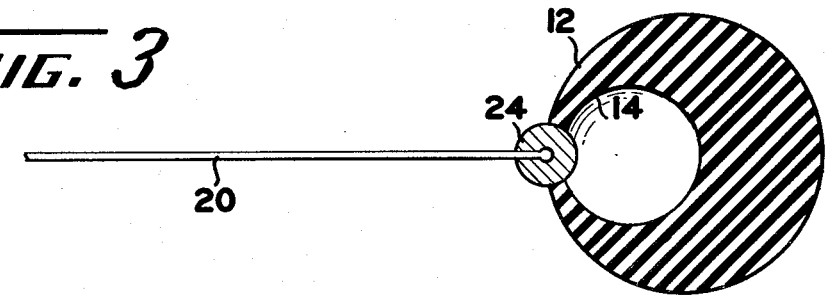
INVENTOR.
Alfin L. Jorde

United States Patent Office 3,204,339
Patented Sept. 7, 1965

3,204,339
MEASURING MEANS FOR LARGE SURFACE AREAS
Alfin L. Jorde, Box 385, Blooming Prairie, Minn.
Filed Apr. 13, 1962, Ser. No. 187,428
1 Claim. (Cl. 33—137)

This invention generally pertains to apparatus or means for measuring large surface areas such as the roofs of buildings, e.g., houses, barns, sheds, etc. It is sometimes necessary to measure very accurately such roofs. For example, in estimating the cost of recovering or resurfacing a roof of an existing building where building drawings are not available, it is very desirable to know the exact area of the roof to be covered, an approximate area not being adequate for the purpose of operating a profitable business. In other words, an estimate which is too low (based on an inaccurate area determination) will result in expenses exceeding the estimate. Conversely, if the area determination is too high, then one's competition may be awarded the contract.

Heretofore, various schemes have been used to determine roof areas. An accurate method (but often dangerous to life and limb) is to scale a ladder or in some other way actually get on the roof and measure its length and width. Of course with roofs which are steeply pitched, this is impossible for all practical purposes.

Another prior art method is to use a "pitch card" which involves standing off from the end of the building and by adjuting a member of the card to "fit" the gable end of the roof. The "pitch" information thus obtained can be correlated with the measured width of the building to compute the roof rafter length and this information with the length of the building enables one to compute the roof area. However, the answers obtained by this method are not sufficiently exact. Also, this technique is not applicable to many roofs such as a Dutch roof, round roof, barn roof, or other curved or non-colinear roof surfaces.

The present invention provides a measuring instrument which solves the above problems. With it, one can very accurately measure any roof regardless of configuration from the ground.

The present invention generally comprises measuring means for large surface areas comprising in combination: a substantially symmetrically shaped member; flexible tape means adapted to be stored in tape storage means and including indicia means thereon; and means connecting an end of said tape to said member including means for automatically disengaging the member from said tape at a relative tension therebetween which is less than the tensile breaking point of said tape.

In a more specific embodiment of the invention, it takes the form of measuring means for large surface areas comprising in combination: a substantially spherically shaped member characterized by being at least in part resilient; flexible tape means adapted to be stored in tape storage means and including indicia means thereon; and means connecting an end of said tape means to said member.

It is an object of the invention therefore to provide an improved measuring means.

These and other objects of the invention will become more clearly understood from a reading of the following detailed description of one embodiment of the invention and appended claim together with the drawings in which:

FIGURE 1 is a cross-sectional side view of one embodiment of my invention;

FIGURE 2 is a top view of the device shown in FIGURE 1; and

FIGURE 3 is a view similar to that of FIGURE 1 with the flexible tape almost disengaged from the hollow portion within the spherically shaped member.

Referring to FIGURES 1–3, the reference numeral 10 generally depicts a roof or large surface measuring means or device comprising a substantially symmetrically shaped member 12 of substantial mass. Mass 12 in this embodiment is a substantially spherically shaped or ball-like member and in this embodiment is preferably made out of a resilient material such as rubber.

The ball-like member 12 has a hollow portion or cavity or recess 14 therein; as shown, the cavity 14 is spherical in shape and is non-symmetrical with respect to the center of member 12. A relatively small aperture 16 is provided in the surface of member 12 to provide an entry or communication into recess 14 from the exterior of the member 12.

A flexible tape means 20 is provided; this may be of standard construction such as a flexible fabric tape in widespread use. Other tape materials also may be used. One end of the tape means 20 is adapted to be attached to a suitable tape storage means such as a hand operated storage drum or reel.

The other end 22 of the tape means 20 is connected to the ball-like member 12. The connection of the tape means 20 to the ball-like member 12 can take various forms but preferably is a strain-release type of connection (for reasons explained below) which will cause the ball member to be disengaged from the tape upon a relative tension therebetween which is less than the tensile breaking point of said tape.

The specific connection means depicted includes a small end piece 24 securely attached to the end piece 22 of the tape. Piece 24 may be a round shot or spherically shaped means clamped or otherwise suitably secured to end 22 of tape 20. One arrangement is to have piece 24 a "split shot" which is securely clamped down on the end of tape 20. The size of the end piece 24 is selected so that it is somewhat larger in cross-section than the aperture or opening 16. The resiliency of the member 12 permits the end piece 24 to be inserted through opening 16 so that it resides in recess or cavity 14.

Tape means 20 is provided with a suitable indicia or scale 25 for measurement purposes. The end 22 of tape means 20 may also be color coded for the first few inches. Thus, for example, the first six inches can be of a first contrasting color and the next 6 inches a second contrasting color.

The disengagement feature is illustrated in FIGURE 3. Here a relative tension has been applied between the tape means 20 and the ball-like member 12. The resiliency of the member 12 is selected so that it will "flex" or "give" in the region of the opening or aperture 16 to release the ball-like end piece 24 attached to the end 22 of the tape at a relative tension between the tape and the member 12 which is less than the tensile breaking point of the tape.

In the use of the measuring means for measuring a roof, the operator or user strips a sufficient amount of tape out of the tape storage means so as to permit the peak of the roof to be reached. This is of course an estimate. Then the operator grasps the ball-like member with the hand of his "throwing arm," holding the tape storage means in the other hand. The ball member is then thrown up and over the peak of the roof to be measured. The tape held in the other hand of the user is then "reeled" in until the color coded end of the tape 20 described above comes into view. The user then knows just when to cease reeling so as to avoid pulling the ball member 12 over the peak. When the ball member 12 is adjacent the peak, the user then notes the particular indicia 12 adjacent the eaves of the roof. This dimension then is the exact length from peak to eave of the roof. The tape is then reeled in more, the ball-like member easily riding over the peak of the roof. For completing the roof area calculation, the tape is used to measure the length of the building (transverse to the first or roof measurement) and of any roof-end overhang. The area thus calculated is doubled to account for the other side.

The resiliency of the ball-like member serves two functions. First, it provides the disengagement feature above described should the relative tension between the tape and ball-like member exceed a certain predetermined value (which is less than the tensile breaking point of the tape). This feature is useful if for some reason the ball-like member becomes wedged or lodged on the roof of the building. Then, upon a sufficient tension being applied to the tape means 20, the ball end piece 24 will be released from within recess 14 and the tape 20 is retrieved intact and free of damage. The ball-like member 12 may fall to the ground when released from the tape or, if necessary, a new ball-like member 12 may be obtained and attached to the end of the tape. The second advantage of the resiliency of the ball-like member is that it assures against damage to the roofs due to the impact of the member landing on the roof.

It will be understood that the measuring means can be used on roofs of all configurations. Roofs having a clearly discernible peak are measured in the above-described manner. Roofs with no clearly discernible peak (such as a half-round roof) are conveniently measured by having the tape extend from one side over the top of the roof to the eave line on the opposite side of the building. Another person can be conveniently used for ascertaining when the ball-like member 12 is adjacent such eave line.

While one specific embodiment has been depicted and described, it will be understood that the invention may take various forms; accordingly, I desire the invention to be construed only in terms of the claim.

I claim:

A roof measuring device comprising in combination: a spherically shaped resilient member having a small opening in the outer surface thereof and a substantial recess therein with said opening permitting access to said recess; a flexible tape having a first end adapted to be connected to a tape winding mechanism; indicia means on said tape; and a metal ball securely connected to another end of said tape, said metal ball having a diameter larger than said opening, said metal ball being positioned in said recess of said resilient member by being forced through said opening.

References Cited by the Examiner

UNITED STATES PATENTS

| 439,297 | 10/90 | Heyder. | |
| 736,052 | 8/03 | Adamson | 33—137 X |
| 1,023,863 | 4/12 | Melville | 33—138 |
| 2,330,470 | 9/43 | Calahan | 33—126.5 |
| 2,602,233 | 7/52 | Irving | 33—137 |

FOREIGN PATENTS

| 1,096,665 | 6/55 | France. |
| 4,904 | 1893 | Great Britain. |
| 324,218 | 1/30 | Great Britain. |

ISAAC LISANN, *Primary Examiner.*
ROBERT L. EVANS, *Examiner.*